United States Patent [19]
Morrow

[11] Patent Number: 5,927,147
[45] Date of Patent: Jul. 27, 1999

[54] POWER SHARING GEAR SETS

[75] Inventor: William Bruce Morrow, Santa Barbara, Calif.

[73] Assignee: Harrier Technologies, Inc., Greenwich, Conn.

[21] Appl. No.: 09/167,760

[22] Filed: Oct. 7, 1998

Related U.S. Application Data

[63] Continuation of application No. 09/021,622, Feb. 9, 1998.

[51] Int. Cl.$^6$ .................................. F16H 1/08; F16H 1/20
[52] U.S. Cl. ................................................................. 74/410
[58] Field of Search ................................................. 74/410

[56] References Cited

U.S. PATENT DOCUMENTS

| | | |
|---|---|---|
| 1,070,589 | 8/1913 | Duffing ..................................... 74/440 |
| 1,273,556 | 7/1918 | Warriner ................................ 74/410 X |
| 1,320,459 | 11/1919 | Edwards ..................................... 74/410 |
| 1,479,157 | 1/1924 | Short ......................................... 74/410 |
| 3,545,296 | 12/1970 | Eggins ....................................... 74/410 |
| 4,612,816 | 9/1986 | Chalik ................................... 74/409 X |
| 4,641,543 | 2/1987 | Jessup ....................................... 74/410 |

*Primary Examiner*—Allan D. Herrmann
*Attorney, Agent, or Firm*—Kenyon & Kenyon

[57] ABSTRACT

In a gear transmission, pairs of helical gears are rotatably mounted on a drive shaft for axial movement on the drive shaft. The pairs of helical gears mounted on the drive shaft engage corresponding pairs of helical gears rotatably mounted on a driven shaft for axial movement on the driven shaft. Retainer members are located adjacent each end of at least one of the shafts to restrict axial movement by helical gears caused by axial separation between pairs of helical gears resulting from commencement of rotation of the drive shaft.

19 Claims, 4 Drawing Sheets

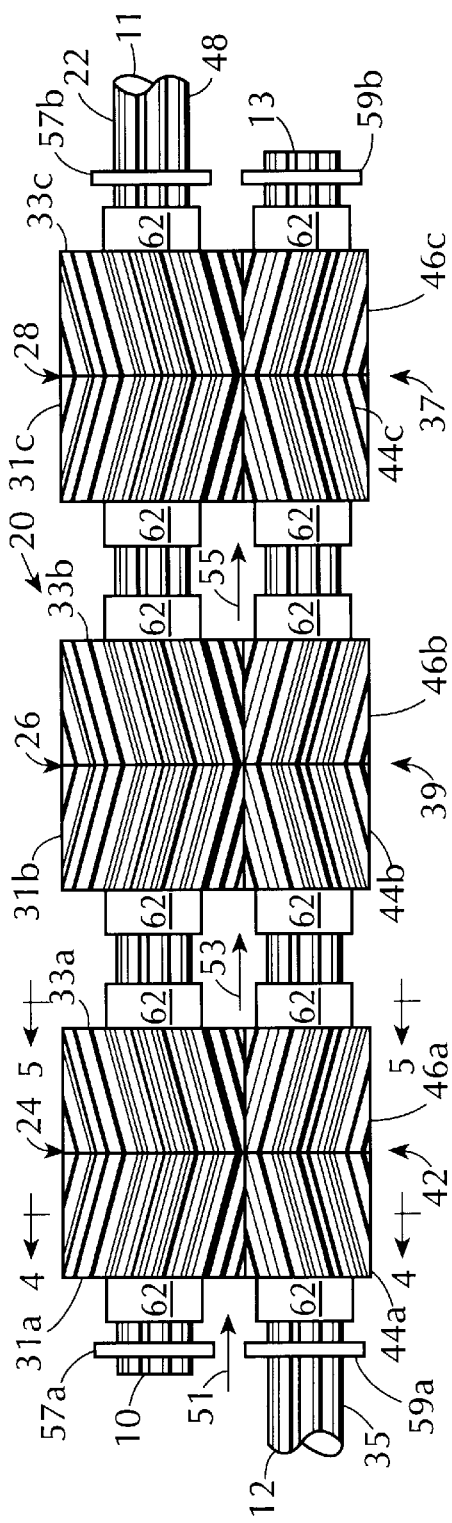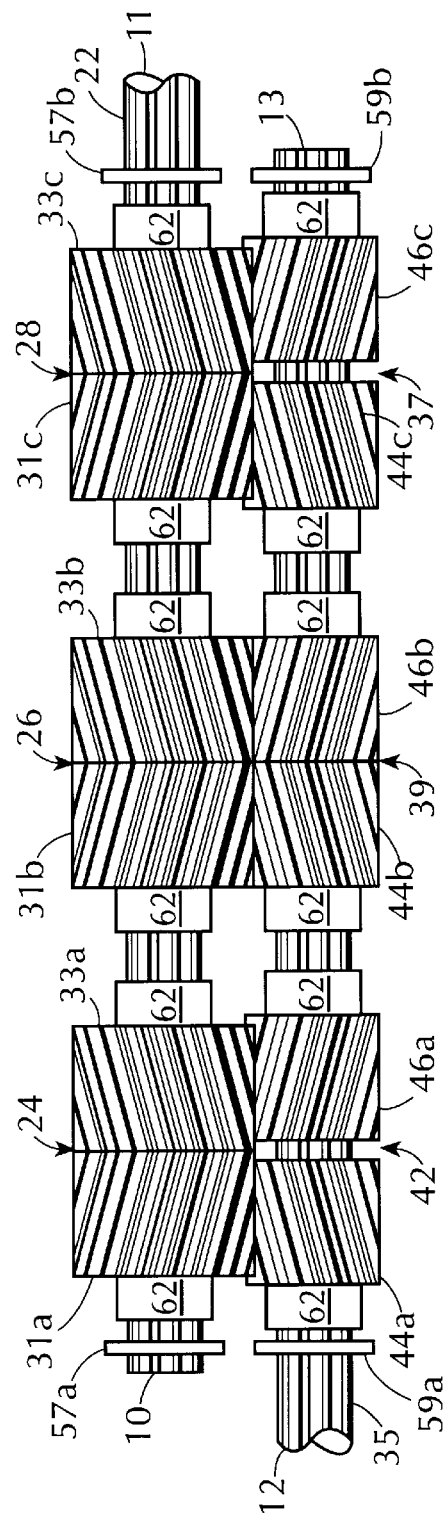

POWER SHARING GEAR SETS

This application is a continuation application under 35 U.S.C. §120 of prior application Ser. No. 09/021,622 filed Feb. 9, 1998.

FIELD OF THE INVENTION

The present invention is directed to improvements in load sharing amongst gears when multiple gears are mounted on a common shaft. More particularly, the present invention is directed to a gear transmission having pairs of helical gears mounted on a drive shaft for engagement with respective pairs of helical gears mounted on a driven shaft resulting in even load sharing amongst engaging gears.

BACKGROUND OF THE INVENTION

Transmissions that have constraints on the size of the diameter of gears due to space limitations, but which are also required to transmit significant power, have up to now presented difficult design problems. An appealing concept for the solution to this problem is the use of multiple gears on a common shaft. Each set of engaging gears on a common drive shaft and a common driven shaft would transmit a relatively low load. However, the combined load transmitted by a plurality of sets of engaging gears on a common drive shaft and a common driven shaft would be relatively large. This apparent simple theoretical solution has proven to be impractical because of the difficulty in achieving even load sharing among sets gears.

Due to gear manufacturing tolerances, multiple gears on a drive shaft are not likely to be perfectly aligned with the corresponding multiple gears on a driven shaft. When load is applied, sets of gears on the drive and driven shafts are not likely to simultaneously mate. This non-perfect alignment results in sets of gears on the drive and driven shaft to engage unevenly. This results in one or more sets of gears to be loaded higher than their design load with resulting premature failure due to excessive load or wear. Minor misalignments in the drive and driven shafts and shaft flex also are factors contributing to the uneven loading of engaging sets of gears on the drive and driven shafts.

Up until the time of the present invention, very precise tolerances were required to successfully construct a transmission having multiple gears on a common shaft. As is appreciated by one skilled in the art, the more precise the tolerances required, the greater are the manufacturing costs. Because of these tolerance-cost considerations, transmissions having multiple gears on a single shaft were generally impractical.

OBJECTS OF THE INVENTION

It is an object of the present invention to provide a gear transmission that can transmit high torque when space limitations in the intended operating environment of the transmission limits the diameter of the transmission gears.

It is a further object of the present invention to provide a transmission having multiple sets of engaging gears on a common drive shaft and a common driven shaft where in each gear set, during operational power transmission, is evenly loaded; such even loading is attained without the need of precise manufacturing tolerances; and such even loading is attained by a mechanical design which is industrially practical and cost effective to manufacture.

It is yet another object of the present invention to provide a transmission having multiple sets of engaging gears on a common drive shaft and a common driven shaft wherein even loading of each gear set results in reduced wear on the gears, thus greatly extending periods between scheduled maintenance and down time for repair.

These and other objects of the present invention will become apparent from the following description and claims read in conjunction with the drawings.

SUMMARY OF THE INVENTION

The present invention is directed to a gear transmission having pairs of helical gears mounted on a drive shaft engaging pairs of helical gears mounted on a parallel driven shaft. In operation, the present invention obtains even load sharing among engaging and mating gears during power transmission.

The pairs of helical gears mounted for rotation on the drive shaft and the driven shaft are also mounted, by using for example spline shafts, for axial movement on the respective shafts. Retaining members on the respective shafts permit axial movement of the helical gears on the shafts but stop further axial movement at a selected position.

In one embodiment of the present invention, the drive shaft is rotated in the counter-clockwise direction. The angle of the helical cut on the helical gear pairs mounted on the drive shaft has a hand on adjacent gear pairs such that adjacent gear pairs are pushed together in the axial direction due to axial thrust caused by counter-clockwise rotation. The angle of the helical cut on the helical gear pairs mounted on the driven shaft has a hand on adjacent gear pairs such that the adjacent driven shaft gear pairs separate and spread by movement of each gear in the gear pair in opposite axial directions due to axial thrust caused by mating with engaging drive gears.

Due to manufacture tolerances of the gears, upon the start of counter-clockwise rotation of the drive shaft, one pair of helical drive gears on the drive shaft will mate with a corresponding engaging helical gear pair on the driven shaft and establish axial thrust forces due to this mating prior to other helical gear pairs mating. As discussed, the helical gear pairs mounted on the driven shaft have a helical cut such that the hand of the cut on adjacent pairs of gears will cause axial spreading of the gears due to axial thrust forces created upon mating with a counter-clockwise rotating engaging pair of gears on the drive shaft. Thus, this first pair of helical gears on the driven shaft, which mate with a corresponding pair of helical gears on the drive shaft, start to spread with each gear in the gear pair moving axially on the driven shaft in opposite directions. Due to the spreading of this pair of gears on the driven shaft, there is no rotation of this pair of gears on the driven shaft and no loading of the drive shaft.

Continued rotation of the drive shaft causes a second pair of helical gears on the drive shaft to mate a second pair of engaging helical gears on the driven shaft. The pair of engaging helical gears that are the second to mate is a function of the manufacturing tolerances of the gears. The pair of helical gears on the driven shaft of this second set of helical gear pairs start to spread and separate in the axial direction in the manner previously described. Again, due to the spreading of the pairs of helical gears on the driven shaft, there is no rotation of the gears on the driven shaft and no loading of the drive shaft.

Rotation of the drive shaft continues until all pairs of helical gears on the drive and driven shaft mate and all pairs of helical gears on the driven shaft start to spread in the axial direction of the driven shaft and the two outermost helical gears on the driven shaft are forced by this spreading against retainer members on the driven shaft. The drive shaft then becomes loaded and starts rotation of the driven shaft. The helical gear pairs on the driven shaft adjust their separation to balance load and the helical gear pairs on the drive shaft center themselves with their corresponding engaging and mating spread helical gear pairs on the driven shaft to balance load transmission.

The system is self balancing and there is even load sharing amongst all the gears.

BRIEF DESCRIPTION OF THE DRAWINGS

In the drawings forming part hereof:

FIG. 1 is a schematic view of one embodiment of a transmission in accordance with the present invention illustrating pairs of helical gears on a drive shaft and pairs of helical gears on a driven shaft prior to commencement of rotation of the drive shaft;

FIG. 2 is a schematic view of the embodiment of the present invention illustrated in FIG. 1 wherein rotation of the drive shaft has just commenced, and some, but not all, of the pairs of helical gears on the driven shaft have mated with corresponding pairs of helical gears on the drive shaft and started separation in the axial direction of the driven shaft (distance of separation greatly exaggerated), this being prior to loading of gears on the driven shaft with resulting rotation of the driven shaft;

DETAILED DESCRIPTION

Figure 3:
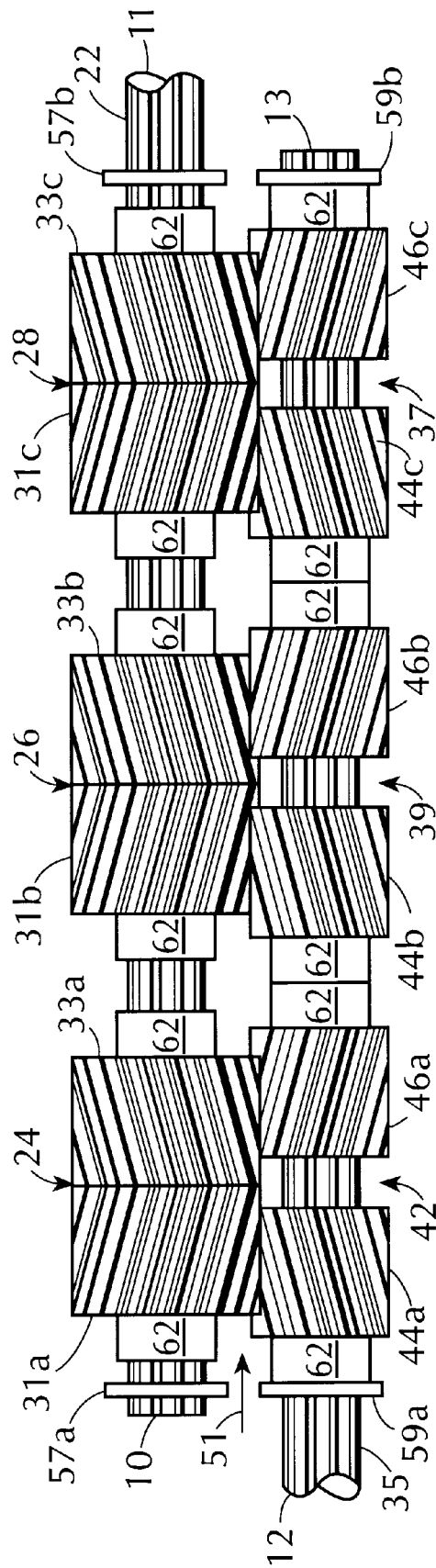
FIG. 3 is a schematic view of the embodiment of the present invention illustrated in FIG. 1 wherein rotation of the drive shaft has proceeded to where all corresponding pairs of helical gears on both drive and driven shafts are mated to cause all pairs of helical gears on the driven shaft to be separated in the axial direction of the driven shaft at a distance (distance of separation greatly exaggerated) resulting in even loading of the gears and rotation of the driven shaft.

In order to provide a more complete understanding of the present invention and an appreciation of its advantages, a detailed description of preferred embodiments is now provided with reference to the drawings.

FIG. 1 schematically illustrates one embodiment of a paired helical gear transmission in accordance with the present invention. With reference to FIG. 1, there is provided a drive shaft 22 having a first end 10 and a second end 11. Second end 11 of drive shaft 22 would be adapted for connection to a drive mechanism (not illustrated) for rotating drive shaft 22. Located parallel to drive shaft 22 is driven shaft 35 having a first end 12 and a second end 13. First end 12 of driven shaft 35 would be adapted for connection to an output mechanism (not illustrated) for receiving output rotation and power.

Mounted for rotation on drive shaft 22 are paired helical gears 24, 26 and 28. Paired helical gears 24, 26 and 28 are also mounted on drive shaft 22 for axial movement on drive shaft 22 in the axial direction of drive shaft 22. Preferred mounting mechanisms will herein after be discussed.

Each paired helical gear 24, 26 and 28 on drive shaft 22 comprises a first gear half 31a, 31b and 31c, respectively, on the side of the first end 10 of drive shaft 22 and a second gear half 33a, 33b and 33c, respectively, on the side of the second end 11 of drive shaft 22.

Mounted for rotation on driven shaft 35 are paired helical gears 42, 39 and 37. Paired helical gears 42, 39 and 37 are also mounted on driven shaft 35 for axial movement on driven shaft 35 in the axial direction of driven shaft 35. Each paired helical gear 42, 39 and 37 mounted on driven shaft 35 comprises a first gear half 44a, 44b and 44c, respectively, on the side of first end 12 of the driven shaft 35 and a second gear half 46a, 46b and 46c, respectively, on the side of second end 13 of driven shaft 35.

Paired helical drive gear 24 engaging paired helical driven gear 42 forms a first paired helical gear set 51. Paired helical drive gear 26 engaging paired helical driven gear 39 forms a second paired helical gear set 53. Paired helical drive gear 28 and paired helical driven gear 37 forms a third paired helical gear set. It will be understood that the illustration of three paired helical gear sets in the embodiment of FIGS. 1–3 of the drawings is by way of illustrative example and not by way of limitation. The actual number of paired helical gear sets employed by one skilled in the art would be determined by the design requirements of the intended application.

With reference to paired helical gear set 24, 42, drive gear pair 31a and 33a each have a helical cut at the same angle, but in the opposite sense to one another, which results in the thrust of gear half 31a and gear half 33a to be directed inward pushing gear half 31a and gear half 33a tightly together when drive shaft 22 is rotated in the counter-clockwise direction. With further reference to paired helical gear set 24, 42, driven gear pair 44a, 46a each have a helical cut at the same angle, but in the opposite sense to one another, which results in the thrust of gear half 44a and gear half 46a to be directed outward causing gear half 44a and gear half 46a to separate in the axial direction of driven shaft 35 when drive shaft 22 rotates in the counter-clockwise direction for causing driven shaft 35 to rotate in the clockwise direction.

The helical cut of drive gear 31a is at the same angle but in the opposite sense to the helical cut of driven gear 44a. The helical cut of drive gear 33a is at the same angle but in the opposite sense to the helical cut of driven gear 46a.

Figure 6:
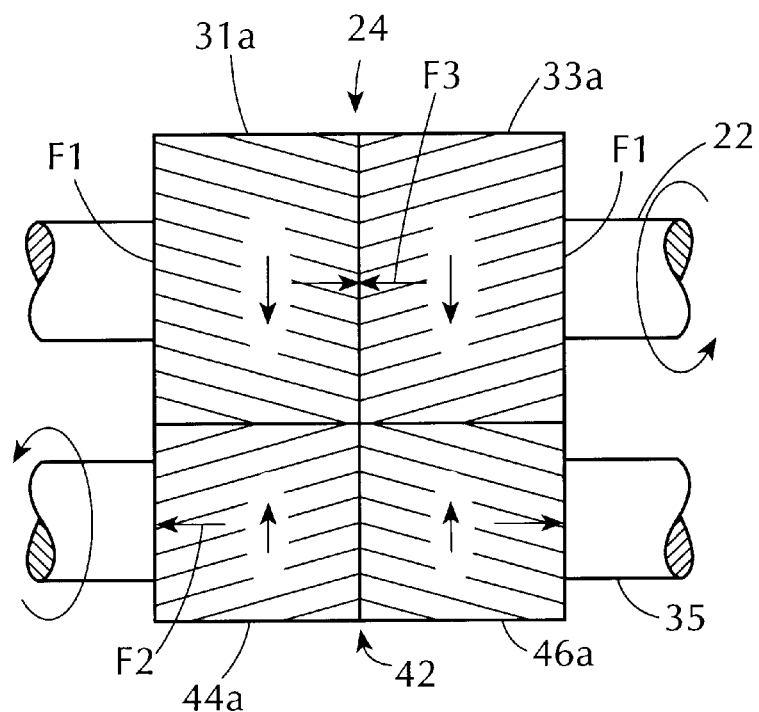
FIG. 6 is a vector force diagram illustrating the forces acting on a set of paired helical gears at the start of counter-clockwise rotation of the drive shaft, all in accordance with one embodiment of the present invention.
Figure 7:
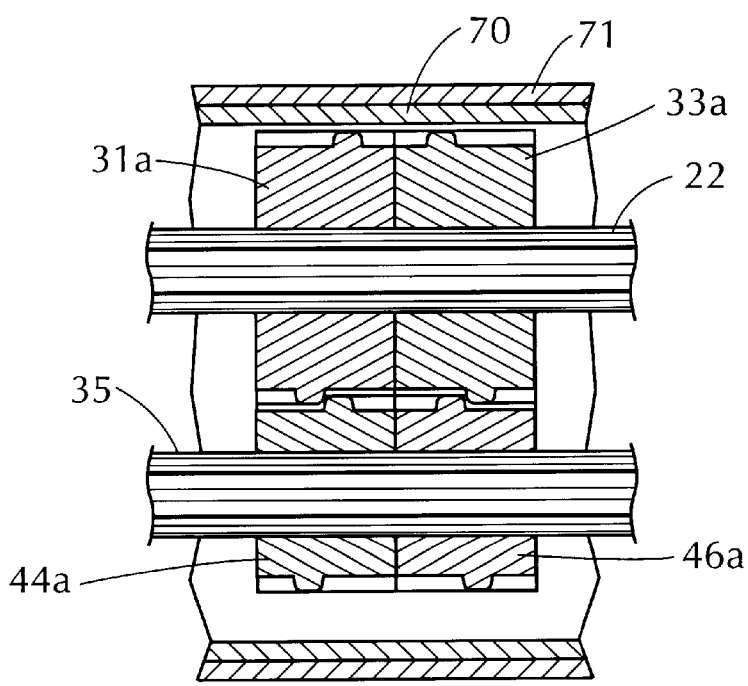
FIG. 7 is a schematic cross-sectional view along line 7—7 of FIG. 4.

By way of further explanation and with reference to FIG. 6, when drive shaft 22 is rotated in the counter-clockwise direction and when the helical gear teeth of paired drive gears 31a and 33a, which engage the helical gear teeth of paired driven gears 44a and 46a, mate with the helical gear teeth of paired driven gears 44a and 46a, a force F1 is created for rotation of driven shaft 35 in the clockwise direction. A thrust force F2 causes driven gears 44a and 46a to separate in the axial direction of driven shaft 35. A thrust force F3 causes drive gears 31a and 33a to be pushed tightly together in the axial direction of drive shaft 22. The force represented by vector F2 is equal and opposite to the force represented by vector F3.

In accordance with another embodiment of the present invention (not illustrated), drive shaft 22 could be rotated in the clockwise direction establishing forces which cause drive gears 31a and 33a to separate in the axial direction of the drive shaft 22 and driven gears 44a and 46a to be pushed together in the axial direction of the driven shaft. It will be apparent to one skilled in the art, with reference to FIG. 6, that the sense or the hand of the helical cut of all of gears 31a, 33a, 44a and 46a illustrated could be reversed or made opposite and the described principles of operation, in accordance with the present invention, would apply.

The foregoing description with respect to paired helical gear set 24, 42 applies to paired helical gear set 26, 39 and pair helical gear set 28, 37.

With reference to the drawings, it can be observed that when the pairs of engaging helical gears on the drive shaft and the driven shaft abut in the axial direction, i.e., prior to separation of one pair of gears of a gear set, there is a herringbone appearance.

With further reference to the drawings, it will be appreciated by one skilled in the art that the angle of the helical cut with respect to the axial centerline of the respective drive shaft or driven shaft for each helical gear of each paired helical gear set will be the same, with the sense or the hand of the angle of the helical cut varying as previously described. By way of example and with reference to FIGS. 1, 2, 3 and 6 of the drawings, it can be seen that the helical cut of gear half 33a is at an acute angle with respect to the axis of drive shaft 22 when the angle is measured counterclockwise from the axis of drive shaft 22 to the helical cut of gear half 33a. Likewise, it can be seen that the helical cut of gear half 31a is at an acute angle with respect to the axis of drive shaft 22 when the angle is measured clockwise from the axis of drive shaft 22 to the helical cut of gear half 31a. The acute angles of the helical cut of gear half 31a and gear half 33a are equal but are in the opposite hand or in the opposite sense. As can be seen in drawings, this description applies to the other pairs of helical gears illustrated.

With yet further reference to the drawings, it will be appreciated by one skilled in the art that the diameter of the helical gears on the drive shaft 22 is larger than the diameter of the helical gears on the driven shaft 35. Thus, the embodiment of the present invention illustrated in the drawings is a step up transmission. It will be further appreciated by one skilled in the art that the diameter of the helical gears on the drive shaft may be smaller than the diameter of the helical gears on the driven shaft, with this embodiment of the present invention (not illustrated) being a step down transmission. As illustrated, the diameter of all helical gears mounted on the drive shaft is the same and the diameter of all helical gears mounted on the driven shaft is the same.

Figure 4:
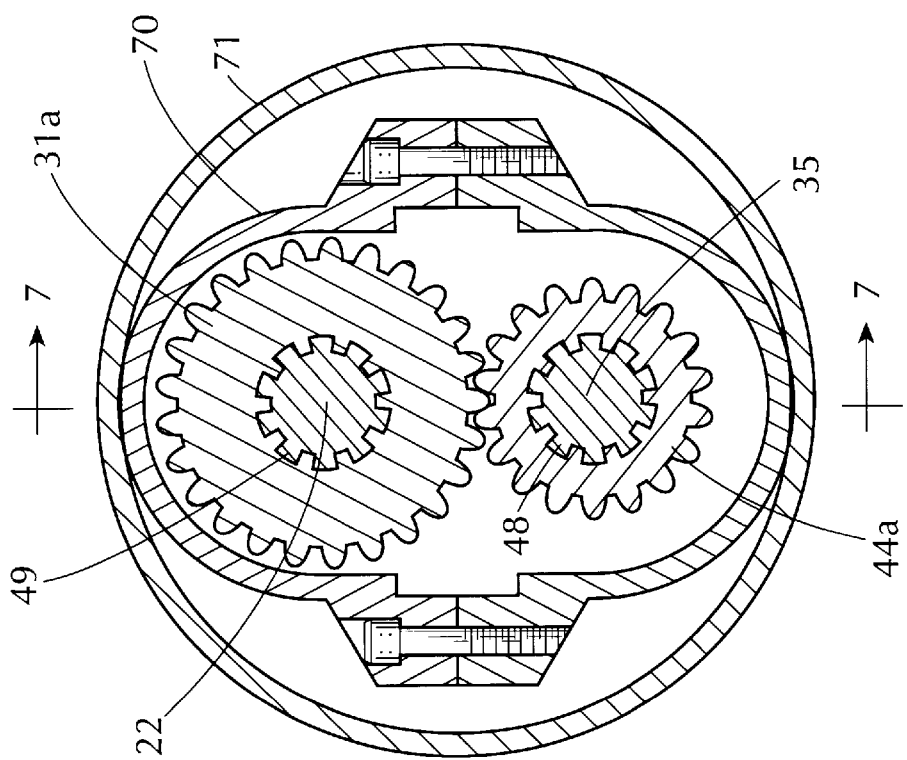
FIG. 4 is a schematic cross-sectional view along line 4—4 of FIG. 1 with an inner and outer casing added.

A preferred manner of mounting the helical gears on the drive shaft 22 and the driven shaft 35, as particularly illustrated in FIG. 4, is the use of a spline shaft. FIG. 4 is a cross-section at 4—4 of FIG. 1 with inner housing 70 and outer housing 71 added. FIG. 4 shows drive shaft 22 being a spline shaft having teeth 49 engaging corresponding notches in helical drive gear 31a. Likewise, driven shaft 35 is a spline shaft having teeth 48 engaging corresponding notches in helical driven gear 44a. As will be appreciated, the spline shaft mounting results in the transmission of rotational movement and power between respective gears and shafts. The spline shaft mounting also permits axial movement of the gears on their respective shafts. The illustrated embodiment of the use of a spline shaft is by way of example and not limitation. Other mechanisms may be selected by one skilled in the art to mount the helical gears to their respective shafts for both rotation and axial movement, such as being keyed rather than splined.

With reference to FIGS. 1, 2 and 3, the outer face of each paired helical gear has a cylindrical flange bearing member 62 mounted thereto. For purposes of clarity in FIGS. 1, 2 and 3, the bearing housing has been removed. That is, helical gear half 31a, 31b and 31c each have a cylindrical flange bearing member 62 mounted on their respective outer face perpendicular to the axis of drive shaft 22 facing first end 10 of drive shaft 22.

Helical gear half 33a, 33b and 33c each have a cylindrical flange bearing member 62 mounted on their respective outer face perpendicular to the axis of drive shaft 22 facing second end 11 of drive shaft 22. Helical gear half 44a, 44b and 44c each have a cylindrical flange bearing member 62 mounted on their respective outer face perpendicular to the axis of driven shaft 35 facing first end 12 of driven shaft 35. Helical gear half 46a, 46b and 46c each have a cylindrical flange bearing member 62 mounted on their respective outer face perpendicular to axis of driven shaft 35 facing second end 13 of driven shaft 35.

Figure 5:
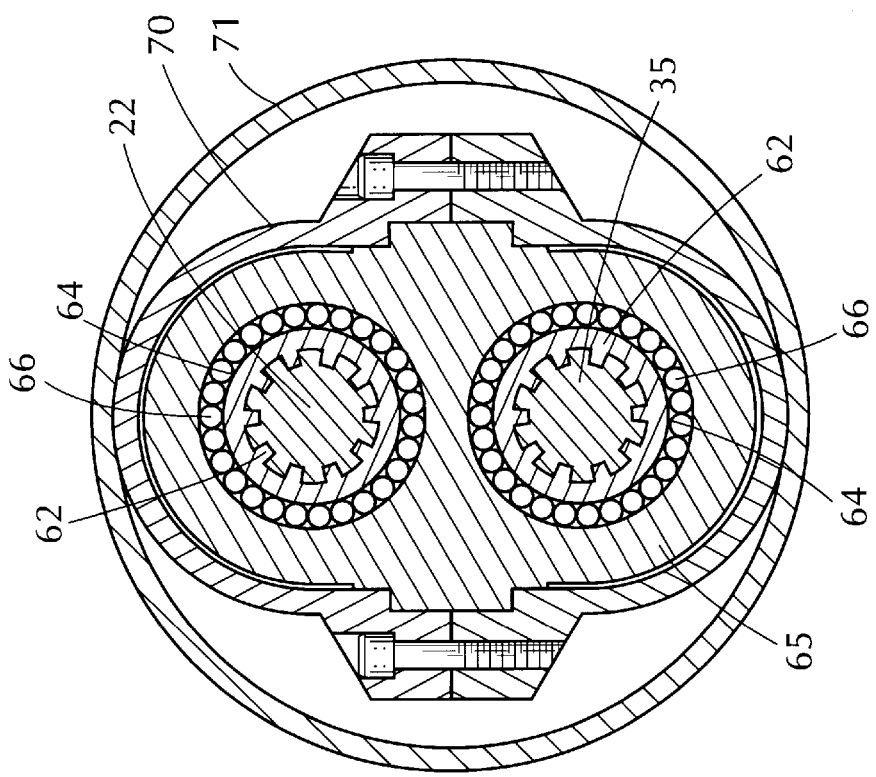
FIG. 5 is a schematic cross-sectional view along line 5—5 of FIG. 1 with an inner and outer casing added and a bearing housing added.

Bearing member 62 is further explained in conjunction with FIG. 5 of the drawings. FIG. 5 is a cross-sectional view along line 5—5 of FIG. 1 with bearing housing 65 added. As illustrated in FIG. 5, bearing members 62 are splined respectively to drive shaft 22 and driven shaft 35. The outer cylindrical surface 64 of bearing member 62 is a bearing race for bearings 66. It will be appreciated that bearing wall 65 supports bearing members 62 and maintains the alignment of drive shaft 22 and driven shaft 35.

With reference to the embodiment of the present invention illustrated in FIGS. 1–3, located near the first end 10 of drive shaft 22 is retaining ring 57a and located near the second end 11 of drive shaft 22 is retaining ring 57b. Located near the first end 12 of driven shaft 35 is retaining ring 59a and located near the second end 13 of driven shaft 35 is retaining ring 59b. The retaining rings 57a, 57b, 59a, 59b are mounted to their respective shafts so that they cannot move in the axial direction of their respective shafts. Retaining rings 57a and 57b on drive shaft 22 retain or stop axial movement of the drive helical gears on drive shaft 22. Retaining rings 59a and 59b on driven shaft 35 retain or stop axial movement of the driven helical gears on driven shaft 35. The function of the retaining rings will be more fully hereinafter explained.

Drive shaft 22 and driven shaft 35 are mounted (not illustrated) so that they do not move in their respective axial directions in response to forces established by rotation of the respective shafts and rotation of the respective helical gears.

Operation of the transmission, in accordance with the present invention, will now be explained in conjunction with FIGS. 1–3. FIG. 1 illustrates the embodiment of the present invention using three sets of paired helical gears prior to the start of rotation of drive shaft 22. Upon start of rotation of drive shaft 22, due to manufacturing tolerances in the gears, one set of paired of helical gears, say, for example, 24, 42, will mate first. The thrusts previously explained in connection with FIG. 6, will cause driven helical gears 44a and 46a to begin to separate. Drive helical gears 31a and 33a will be pushed together. This allows drive shaft 22 to further rotate without loading or rotating the driven gears. Due to the manufacturing tolerances and continued rotation of drive shaft 22, one or more addition set of paired helical gears will mate, say for example, 28, 37, and the driven helical gears 44c and 46c will begin to separate. Drive helical gears 31c and 33c will be pushed together. This is illustrated in FIG. 2 of the drawings where driven helical gears 44a and 46a of paired helical gear set 24, 42 have begun to separate in the axial direction of driven shaft 35 and where driven helical gears 44c and 46c of paired helical gear set 28, 37 have begun to separate in the axial direction of driven shaft 35.

Manufacturing tolerances will continue to permit rotation of the drive shaft 22 without loading of the drive shaft and rotation of the driven shaft 35 due to the continued spreading of the pairs of driven helical gears of the helical gear sets until such time that the retaining rings 59a, 59b on driven shaft 35 stop axial spreading of the driven helical gear pairs and the bearing members 62 of adjacent driven helical gear halfs are in abutment. This is illustrated in FIG. 3. The design permits the drive shaft 22 to continue to rotate in the unloaded condition until all the helical gear sets mate and spreading of all the driven helical gear pairs starts in the axial direction of the driven shaft without loading and rotation of the driven shaft. That is, retaining rings 59a and 59b are located on the driven shaft 35 to provide sufficient axial play or axial distance so that the driven helical gear pairs of all helical gear sets have begun to separate in the axial direction of driven shaft 35 prior to bearing number 62 of driven gear 44a being abutted with force against retaining ring 59a and bearing member 62 of driven gear 46c being abutted with force against retaining ring 59b. At the time retaining rings 59a and 59b prevent any further total axial spreading of the driven helical gears, loading of drive shaft 22 and rotation of driven shaft 35 begin. The distance of the spreading between gear halfs of the paired driven helical gears still can change relative to one another to balance load, hereinafter more fully discussed.

FIG. 3 illustrates the spreading of all pairs of driven gears 44a and 46a, 44b and 46b, and 44c and 46c in the axial direction of driven shaft 35 with axial spreading being stopped by retaining rings 59a and 59b. That is, in FIG. 3, bearing member 62 of gear half 44a abuts retaining ring 59a; bearing member 62 of gear half 46a abuts bearing member 62 of gear half 44b; bearing member 62 of gear half 46b abuts bearing member 62 of gear half 44c and bearing member 62 of gear half 46c abuts retaining ring 59b.

The unloaded rotation of the drive shaft continues until all the play or axial movement of the driven helical gear pairs permitted by the positioning of the retaining rings on driven shaft 35 is taken up. When the driven gear pairs on the driven shaft are bearing against one another and against the retaining rings or restraints, all driven helical gears are engaged, mated and equally loaded, as hereinafter more fully explained, and rotation of the driven shaft begins.

Since the thrust separating the driven gear pairs is directly proportional to the load carried by each pair, any imbalance in the load results in a thrust imbalance between the driven gear pairs, That is, the driven gear pair which is experiencing a heavier load will start spreading further. Since the retaining rings or restraints will not allow any additional total axial spreading of the gears on the driven shaft, the spreading of the heavier loaded helical pair of driven gears causes other pairs of driven helical gears on the driven shaft to be pushed toward one another reducing their axial separation, which increases their load share and thereby rebalances the load. Since all the gears on the driven shaft are allowed to move freely and interact with one another, there is a net thrust from only the gear half at each end of the driven shaft. The thrust of the other gears is balanced by the opposite thrust of adjacent gears.

Just as the driven sided helical gear halfs must be free to move axially on the driven shaft, the drive shaft helical gear halfs must be free to move axially on the drive shaft.

As previously discussed, the counter-clockwise rotation of drive shaft 22 results in the drive helical gear pairs 31a and 33a, 31b and 33b, and 31c and 33c to be pushed tightly together in the axial direction of the drive shaft 22. However, the drive side helical gear pairs must be free to move axially on the drive shaft 22. Due to differences in manufacturing tolerances, the driven helical gear pairs on the driven shaft do not spread equally in the axial direction. This uneven spacing of the driven helical gear pairs results in an unbalanced load on one side or the other of the drive side pairs which causes the drive side pairs to move axially along the drive shaft to "center" themselves with respect to the corresponding driven side pair to achieve a balanced load.

The foregoing described interaction between the helical gears on the drive shaft and the driven shaft results in automatic balancing of load between all engaging and mating helical gears.

In the embodiment described, the retaining rings 59a, 59b must permit for sufficient play or axial movement of the helical gear pairs on the driven shaft 35 so that all helical gear pairs mounted on the driven shaft 35 spread prior to retaining rings 59a, 59b preventing additional axial spreading and thus load being transmitted from the drive shaft 22 to the driven shaft 35.

The distance of axial spreading of the driven helical gear pairs illustrated in FIGS. 2 and 3 is greatly exaggerated for purposes of clear description of the present invention. In actual practice, the axial spreading of the helical gear pairs on the driven shaft of the illustrative embodiment will be on the order of a few thousandths of an inch or on the order of a thousandth of a millimeter.

It will be understood that the embodiment of the present invention described in conjunction with FIGS. 1 to 3 is only by way of illustrative example to explain the principles of the present invention. Many other embodiments of the present invention will become readily apparent to one skilled in the art. As previously discussed, the embodiment of the present invention illustrated in FIGS. 1–3 uses three sets of paired helical gears. The number of sets of paired helical gears selected would be dependent upon the design criteria for a specific application. The diameters of the gears on the drive and driven shaft may be selected to provide either a step up or step down transmission. The drive shaft of the embodiment of FIGS. 1–3 may be rotated in the clockwise direction. This would cause the helical gear pairs on the drive shaft to separate and the helical gear pairs on the driven shaft to be pushed together. The principles of operation of the present invention would be the same as previously described. The sense or the hand of the angle of the helical cut with respect to the axis of the drive and driven gears for all the gears illustrated in FIGS. 1–3 could be reversed. As will be apparent to one skilled in the art, this will not change the principles of operation of the present invention. It will also be apparent to one skilled in the art, that in the embodiment illustrated and described in conjunction with FIGS. 1–3 for counter-clockwise rotation of the drive shaft 22, helical gear halfs 31a, 33a could be machined from a common piece of metal because helical gear halfs 31a, 33a in this specific illustrative embodiment do not separate with respect to one another in the axial direction of the drive shaft.

The present invention provides for a commercially practical, cost-effective gear transmission having multiple gears on a common drive shaft and a common driven shaft. The gears used in the present invention need only have commercially practical, cost-effective manufacturing tolerances.

Although preferred embodiments of the present invention have been described in detail, it is apparent that modifications may be made by those skilled in the art within the spirit and the scope of the present invention as defined in the claims.

What is claimed is:

1. A gear transmission comprising:

a drive shaft having a first end, a second end and an axis;

a driven shaft disposed parallel to said drive shaft, said driven shaft having a first end, a second end and an axis, whereby the axis of the drive shaft is parallel to the axis of the driven shaft;

at least one set of helical gears, said set of helical gears comprising:

a pair of helical drive gears mounted on said drive shaft for rotation by said drive shaft and further mounted on said drive shaft for axial movement on said drive shaft;

a pair of helical driven gears mounted on said driven shaft for driving said driven shaft and further mounted on said driven shaft for axial movement on said driven shaft;

said pair of helical drive gears comprising a first drive helical gear half having a helical cut at a selected angle with respect to the axis of said drive shaft, and a second drive helical gear half having a helical cut having the same angle as said selected angle of said first drive helical gear half but having an opposite sense with respect to the axis of said drive shaft;

said pair of helical driven gears comprising a first driven helical gear half having a helical cut having the same angle as said selected angle of said first drive helical gear half but having an opposite sense with respect to the axis of said driven shaft, and a second driven helical gear half having a helical cut having the same angle as said angle of said second drive helical gear half but in an opposite sense with respect to the axis of said driven shaft, said first driven helical gear half and said second driven helical gear half having helical cuts whereby they axially move on said driven shaft to separate from one another axially on said driven shaft in response to rotation of respective first and second drive helical gear halfs;

said first drive helical gear half mounted on said drive shaft engaging said first driven helical gear half mounted on said driven shaft;

said second drive helical gear half mounted on said drive shaft engaging said second driven helical gear half mounted on said driven shaft;

a first retainer member located at a fixed location on said driven shaft adjacent said first end of said driven shaft and a second retainer member located at a fixed location on said driven shaft adjacent said second end of said driven shaft, with said driven helical gear halfs located on said driven shaft between said first and second retainer members of said driven shaft;

said driven shaft first and second retainer members being spaced apart from one another at a distance in an axial direction of said driven shaft to permit movement of said driven helical gear halfs on said driven shaft in the axial direction of said driven shaft and to prevent said driven helical gear halfs from disengaging respective engaged drive helical gear halfs.

2. A gear transmission comprising:

a drive shaft having a first end, a second end and an axis;

a driven shaft disposed parallel to said drive shaft, said driven shaft having a first end, a second end and an axis, whereby the axis of the drive shaft is parallel to the axis of the driven shaft;

at least one set of helical gears, said set of helical gears comprising:

a pair of helical drive gears mounted on said drive shaft for rotation by said drive shaft and further mounted on said drive shaft for axial movement on said drive shaft;

a pair of helical driven gears mounted on said driven shaft for driving said driven shaft and further mounted on said driven shaft for axial movement on said driven shaft;

said pair of helical drive gears comprising a first drive helical gear half having a helical cut at a selected angle with respect to the axis of said drive shaft, and a second drive helical gear half having a helical cut having the same angle as said selected angle of said first drive helical gear half but having an opposite sense with respect to the axis of said drive shaft, said first drive helical gear half and said second drive helical gear half having helical cuts whereby they axially move on said drive shaft to separate from one another axially on said drive shaft in response to rotation by said drive shaft;

said pair of helical driven gears comprising a first driven helical gear half having a helical cut having the same angle as said selected angle of said first drive helical gear half but having an opposite sense with respect to the axis of said driven shaft, and a second driven helical gear half having a helical cut having the same angle as said angle of said second drive helical gear half but in an opposite sense with respect to the axis of said driven shaft;

said first drive helical gear half mounted on said drive shaft engaging said first driven helical gear half mounted on said driven shaft;

said second drive helical gear half mounted on said drive shaft engaging said second driven helical gear half mounted on said driven shaft;

a first retainer member located at a fixed location on said drive shaft adjacent said first end of said drive shaft and a second retainer member located at a fixed location on said drive shaft adjacent said second end of said drive shaft, with said drive helical gear halfs located on said drive shaft between said first and second retainer members of said drive shaft;

said drive shaft first and second retainer members being spaced apart at a distance from one another in an axial direction of said drive shaft to permit movement of said drive helical gear halfs on said drive shaft in the axial direction of said drive shaft and to prevent said drive helical gear halfs from disengaging respective engaged driven helical gear halfs.

3. A gear transmission comprising:

a drive shaft having a first end, a second end and an axis;

a driven shaft disposed parallel to said drive shaft, said driven shaft having a first end, a second end and an axis, whereby the axis of the drive shaft is parallel to the axis of the driven shaft;

at least two sets of helical gears, each set of helical gears comprising:

a pair of helical drive gears mounted on said drive shaft for rotation by said drive shaft and further mounted on said drive shaft for axial movement on said drive shaft;

a pair of helical driven gears mounted on said driven shaft for driving said driven shaft and further mounted on said driven shaft for axial movement on said driven shaft;

said pair of helical drive gears of each set of helical gears comprising a first drive helical gear half having a helical cut at a selected angle with respect to the axis of said drive shaft, and a second drive helical gear half having a helical cut having the same angle as said selected angle of said first drive helical gear half but having an opposite sense with respect to the axis of said drive shaft;

said pair of helical driven gears of each set of helical gears comprising a first driven helical gear half having a helical cut having the same angle as said selected angle of said first drive helical gear half but having an opposite sense with respect to the axis of said driven shaft, and a second driven helical gear half having a helical cut having the same angle as said angle of said second drive helical gear half but in an opposite sense with respect to the axis of said driven shaft, said first driven helical gear half and said second driven helical gear half of each set of helical gears having helical cuts whereby they axially move on said driven shaft to separate from one another axially on said driven shaft in response to rotation of respective first and second drive helical gear halfs;

wherein for each set of helical gears, said first drive helical gear half mounted on said drive shaft engages said first driven helical gear half mounted on said driven shaft;

wherein for each set of helical gears, said second drive helical gear half mounted on said drive shaft engages said second driven helical gear half mounted on said driven shaft;

a first retainer member located at a fixed location on said driven shaft adjacent said first end of said driven shaft and a second retainer member located at a fixed location on said driven shaft adjacent said second end of said driven shaft, with said driven helical gear halfs of each set of helical gears located on said driven shaft between said first and second retainer members of said driven shaft; and said driven shaft first and second retainer members being spaced apart at a distance from one another in an axial direction of said driven shaft to permit movement of said driven helical gear halfs of each set of helical gears on said driven shaft in the axial direction of said driven shaft and to prevent said driven helical gear halfs of each set of helical gears from disengaging respective drive helical gears.

4. A gear transmission according to claim 3 wherein the angle of the helical cut on each first drive helical gear half of each set of helical gears, the angle of the helical cut on each second drive helical gear half of each set of helical gears, the angle of the helical cut on each first driven helical gear half of each set of helical gears, and the angle of the helical cut on each second driven helical gear half of each set of helical gears results in the first driven helical gear half and the second driven helical gear half of the driven helical gear pair of each set of helical gears separating in the axial direction of the driven shaft upon counter-clockwise rotation of the drive shaft.

5. A gear transmission according to claim 3 wherein the angle of the helical cut on each first drive helical gear half of each set of helical gears, the angle of the helical cut on each second drive helical gear half of each set of helical gears, the angle of the helical cut on each first driven helical gear half of each set of helical gears, and the angle of the helical cut on each second driven helical gear half of each set of helical gears results in the first driven helical gear half and the second driven helical gear half of the driven helical gear pair of each set of helical gears separating in the axial direction of the driven shaft upon clockwise rotation of the drive shaft.

6. A gear transmission comprising:

a drive shaft having a first end, a second end and an axis;

a driven shaft disposed parallel to said drive shaft, said driven shaft having a first end, a second end and an axis, whereby the axis of the drive shaft is parallel to the axis of the driven shaft;

at least two sets of helical gears, each set of helical gears comprising:

a pair of helical drive gears mounted on said drive shaft for rotation by said drive shaft and further mounted on said drive shaft for axial movement on said drive shaft;

a pair of helical driven gears mounted on said driven shaft for driving said driven shaft and further mounted on said driven shaft for axial movement on said driven shaft;

said pair of helical drive gears of each set of helical gears comprising a first drive helical gear half having a helical cut at a selected angle with respect to the axis of said drive shaft, and a second drive helical gear half having a helical cut having the same angle as said selected angle of said first drive helical gear half but having an opposite sense with respect to the axis of said drive shaft, said first drive helical gear half and said second drive helical gear half of each set of helical gears having helical cuts whereby they axially move on said drive shaft to separate from one another axially on said drive shaft in response to rotation by said drive shaft;

said pair of helical driven gears of each set of helical gears comprising a first driven helical gear half having a helical cut having the same angle as said selected angle of said first drive helical gear half but having an opposite sense with respect to the axis of said driven shaft, and a second driven helical gear half having a helical cut having the same angle as said angle of said second drive helical gear half but in an opposite sense with respect to the axis of said driven shaft;

wherein for each set of helical gears, said first drive helical gear half mounted on said drive shaft engages said first driven helical gear half mounted on said driven shaft;

wherein for each set of helical gears, said second drive helical gear half mounted on said drive shaft engages said second driven helical gear half mounted on said driven shaft;

a first retainer member located at a fixed location on said drive shaft adjacent said first end of said drive shaft and a second retainer member located at a fixed location on said drive shaft adjacent said second end of said drive shaft, with said drive helical gear halfs of each set of helical gears located on said drive shaft between said first and second retainer members of said drive shaft;

said drive shaft first and second retainer members being spaced apart at a distance from one another in an axial direction of said drive shaft to permit movement of drive helical gear halfs of each set of helical gears on said drive shaft in the axial direction of said drive shaft and to prevent said drive helical gear halfs of each set of helical gears from disengaging respective engaged driven helical gears.

7. A gear transmission according to claim 6 wherein the angle of the helical cut on each first drive helical gear half of each set of helical gears, the angle of the helical cut on each second drive helical gear half of each set of helical gears, the angle of the helical cut on each first driven helical gear half of each set of helical gears, the angle of the helical on each second driven helical gear half of each set of helical gears results in the first drive helical gear half and the second drive helical gear half of the drive helical gear pair of each set of helical gears separating in the axial direction of the drive shaft upon clockwise rotation of the drive shaft.

8. A gear transmission according to claim 6 wherein the angle of the helical cut on each first drive helical gear half of each set of helical gears, the angle of the helical cut on each second drive helical gear half of each set of helical gears, the angle of the helical cut on each first driven helical gear half of each set of helical gears, the angle of the helical on each second driven helical gear half of each set of helical gears results in the first drive helical gear half and the second drive helical gear half of the drive helical gear pair of each set of helical gears separating in the axial direction of the drive shaft upon counter-clockwise rotation of the drive shaft.

9. A gear transmission according to claim 3 or 6 comprising a plurality of said sets of helical gears.

10. A gear transmission according to claim 3 or 6 wherein said drive shaft is a spline shaft and said driven shaft is a spline shaft.

11. A gear transmission according to claim 3 or 6 wherein:
each first drive helical gear half of each set of helical gears has a first face perpendicular to the axis of the drive shaft and facing the first end of the drive shaft, with a bearing member being mounted on said first face, said bearing member projecting toward the first end of the drive shaft;
each second drive helical gear half of each set of helical gears has a second face perpendicular to the axis of the drive shaft and facing the second end of the drive shaft, with a bearing member being mounted on said second face, said bearing member projecting toward the second end of the drive shaft;
each first driven helical gear half of each set of helical gears has a first face perpendicular to the axis of the driven shaft and facing the first end of the driven shaft, with a bearing member being mounted on said first face, said bearing member projecting toward the first end of said driven shaft;
each second driven helical gear half of each set of helical gears has a second face perpendicular to the axis of the driven shaft and facing the second end of the driven shaft, with a bearing member being mounted on said second face, said bearing member projecting toward the second end of said driven shaft.

12. A gear transmission according to claim 11 wherein each bearing member mounted on each first drive helical gear half first face and each bearing member mounted on each second drive helical gear half second face comprises a cylindrical member surrounding said drive shaft rotatably mounted to said drive shaft for axial movement on said drive shaft.

13. A gear transmission according to claim 11 wherein each bearing member mounted on each first driven helical gear half first face and each bearing member mounted on each second driven helical gear half second face comprises a cylindrical member surrounding said driven shaft rotatably mounted to said driven shaft for axial movement on said driven shaft.

14. A method for transmitting load in a gear transmission comprising:
providing a drive shaft and a driven shaft;
mounting a first pair of helical drive gears on said drive shaft for rotational movement by said drive shaft and for axial movement of said first pair of helical drive gears on said drive shaft;
mounting a first pair of helical driven gears on said driven shaft for driving said driven shaft and for axial movement of said first pair of helical driven gears on said driven shaft;
engaging said first pair of helical drive gears mounted on said drive shaft with said first pair of helical driven gears mounted on said driven shaft;
providing said first pair of helical drive gears and said first pair of helical driven gears with helical cuts for causing said first pair of helical driven gears to separate axially on said driven shaft in response to rotation by said engaging first pair of helical drive gears;
rotating said drive shaft and thereby rotating said first pair of helical drive gears and said first pair of helical driven gears and transmitting load from said first pair of helical drive gears to said first pair of helical driven gears;
restraining axial separation of said first pair of helical driven gears on said driven shaft to maintain engagement of said first pair of helical driven gears on said driven shaft with said first pair of helical drive gears on said drive shaft;
said load transmitting causing said first pair of helical drive gears to axially move together on said drive shaft to balance load transmission between said first pair of helical drive gears and said first pair of helical driven gears.

15. A method for transmitting load in a gear transmission according to claim 14 comprising:
mounting at least a second pair of helical drive gears on said drive shaft for rotational movement by said drive shaft and for axial movement of said second pair of helical drive gears on said drive shaft;
mounting at least a second pair of helical driven gears on said driven shaft for driving said driven shaft and for axial movement of said second pair of helical driven gears on said driven shaft;
engaging said second pair of helical drive gears mounted on said drive shaft with said second pair of helical driven gears mounted on said driven shaft;
providing said second pair of helical drive gears and said second pair of helical driven gears with helical cuts for causing said second pair of helical driven gears to separate axially on said driven shaft in response to rotation by said engaging second pair of helical drive gears;
said rotating of said drive shaft causing rotation of said second pair of helical drive gears and said second pair of helical driven gears and transmitting load from said second pair of helical drive gears to said second pair of helical driven gears;
restraining axial separation of said second pair of helical driven gears on said driven shaft to maintain engagement of said second pair of helical driven gears on said driven shaft with said second pair of helical drive gears on said drive shaft;
said load transmitting causing said second pair of helical drive gears to axially move together on said drive shaft to balance load transmission between said second pair of helical drive gears and said second pair of helical driven gears.

16. A method for transmitting load in a gear transmission according to claim 15 comprising:

said load transmitting causes said first pair of helical driven gears axially separating on said driven shaft to interact with said axial separation of said second pair of helical driven gears on said driven shaft and said load transmitting causes said first pair of helical drive gears to axially move together on the drive shaft and said second pair of helical drive gears to axially move together on said drive shaft to balance load transmission between said first pair of helical drive gears and said first pair of helical driven gears and between said second pair of helical drive gears and said second pair of helical driven gears.

17. A method for transmitting load in a gear transmission comprising:

providing a drive shaft and a driven shaft;

mounting a first pair of helical drive gears on said drive shaft for rotational movement by said drive shaft and for axial movement of said first pair of helical drive gears on said drive shaft;

mounting a first pair of helical driven gears on said driven shaft for driving said driven shaft and for axial movement of said first pair of helical driven gears on said driven shaft;

engaging said first pair of helical drive gears mounted on said drive shaft with said first pair of helical driven gears mounted on said driven shaft;

providing said first pair of helical drive gears and said first pair of helical driven gears with helical cuts for causing said first pair of helical drive gears to separate axially on said drive shaft in response to said first pair of helical drive gears rotating said engaging first pair of helical driven gears;

rotating said drive shaft and thereby rotating said first pair of helical drive gears and said first pair of helical driven gears and transmitting load from said first pair of helical drive gears to said first pair of helical driven gears;

restraining axial separation of said first pair of helical drive gears on said drive shaft to maintain engagement of said first pair of helical driven gears on said driven shaft with said first pair of helical drive gears on said drive shaft;

said load transmitting causing said first pair of helical driven gears to axially move together on said driven shaft to balance load transmission between said first pair of helical drive gears and said first pair of helical driven gears.

18. A method for transmitting load in a gear transmission according to claim 17 comprising:

mounting at least a second pair of helical drive gears on said drive shaft for rotational movement by said drive shaft and for axial movement of said second pair of helical drive gears on said drive shaft;

mounting at least a second pair of helical driven gears on said driven shaft for driving said driven shaft and for axial movement of said second pair of helical driven gears on said driven shaft;

engaging said second pair of helical drive gears mounted on said drive shaft with said second pair of helical driven gears mounted on said driven shaft;

providing said second pair of helical drive gears and said second pair of helical driven gears with helical cuts for causing said second pair of helical drive gears to separate axially on said drive shaft in response to said second pair of helical drive gears rotating said engaging second pair of helical driven gears;

said rotating of said drive shaft causing rotation of said second pair of helical drive gears and said second pair of helical driven gears and transmitting load from said second pair of helical drive gears to said second pair of helical driven gears;

restraining axial separation of said second pair of helical drive gears on said drive shaft to maintain engagement of said second pair of helical driven gears on said driven shaft with said second pair of helical drive gears on said drive shaft;

said load transmitting causing said second pair of helical driven gears to axially move together on said driven shaft to balance load transmission between said second pair of helical drive gears and said second pair of helical driven gears.

19. A method for transmitting load in a gear transmission according to claim 18 comprising:

said load transmitting causes said first pair of helical drive gears axially separating on said drive shaft to interact with said axial separation of said second pair of helical drive gears on said drive shaft and said load transmitting causes said first pair of helical driven gears to axially move together on the driven shaft and said second pair of helical driven gears to axially move together on said driven shaft to balance load transmission between said first pair of helical drive gears and said first pair of helical driven gears and between said second pair of helical drive gears and said second pair of helical driven gears.

* * * * *